United States Patent
Roberts et al.

[15] 3,681,428
[45] Aug. 1, 1972

[54] SYNTHESIS OF PHOSPHORANE COMPOUNDS

[72] Inventors: Donald Leroy Roberts; William Yates Rice, Jr., both of Winston-Salem, N.C.

[73] Assignee: R. J. Reynolds Tobacco Company, Winston-Salem, N.C.

[22] Filed: Oct. 24, 1968

[21] Appl. No.: 770,429

[52] U.S. Cl............260/469, 260/473 R, 260/606.5 P
[51] Int. Cl...............................................C07c 69/76
[58] Field of Search........................260/469, 606.5 P

[56] References Cited

UNITED STATES PATENTS

| | | | |
|---|---|---|---|
| 2,114,866 | 4/1938 | Vaughn | 260/989 |
| 3,275,717 | 9/1966 | Butter | 260/989 |
| 3,553,298 | 1/1971 | Hodan | 260/967 |
| 3,140,283 | 7/1964 | Depoorter et al. | 260/469 |
| 3,097,230 | 7/1963 | Miller | 260/473 |
| 3,078,256 | 2/1963 | Wittig et al. | 260/606.5 F |
| 2,945,069 | 7/1960 | Stern | 260/606.5 F |
| 2,912,467 | 11/1959 | Gerecke et al. | 260/469 |
| 2,914,522 | 11/1959 | Ramirez | 260/469 |
| 1,123,572 | 1/1915 | Neumann et al. | 260/469 |

OTHER PUBLICATIONS

Chemistry of Organic Compounds Carl G. Noller 3rd Edition 1965 pp. 535–536.
Chem. Abstracts, Vol. 64, 1966, Col 10470 Hormelin.
Jl. Am. Chem. Soc. Vol. 79, 1957, pp. 6167; 6171, Ramirez.

*Primary Examiner*—Lorraine A. Weinberger
*Assistant Examiner*—R. S. Weissberg
*Attorney*—Pendleton, Neuman, Williams & Anderson

[57] ABSTRACT

Synthesis of phosphorane compounds by reaction of a triarylphosphine, an α-haloester and an amine.

2 Claims, No Drawings

SYNTHESIS OF PHOSPHORANE COMPOUNDS

This invention relates to a method for synthesizing phosphorane compounds. More particularly, the invention relates to a method for synthesizing phosphoranes of the formula:

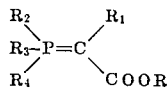

wherein
R represents an alkyl group,
$R_1$ represents hydrogen or an alkyl group,
$R_2$, $R_3$, and $R_4$ each represents an aryl group or a substituted aryl group.

The substituents represented by R are straight chain and branched chain alkyl groups having up to 18 carbon atoms, such as methyl, ethyl, propyl, isopropyl, butyl, isobutyl, amyl, hexyl, octyl, cetyl, lauryl, and the like. $R_1$ represents hydrogen or an alkyl group of the class described above with respect to R. $R_2$, $R_3$, and $R_4$ represent aryl groups such as phenyl, lower alkylphenyl, wherein the lower alkyl group is, for example, methyl, ethyl, propyl, isopropyl and the like, lower alkoxyphenyl, such as methoxy, ethoxy, propoxy, isopropoxy and the like and halophenyl such as chlorophenyl. Phenyl is the preferred substituent represented by $R_2$, $R_3$, and $R_4$.

Previously, preparation of the above phosphorane compounds in non-aqueous medium required the preparation and isolation of the corresponding phosphonium salt. This salt was then reacted with a strong base such as sodium ethoxide to produce the phosphorane. It has now been found that the above phosphorane compounds can be prepared very conveniently, without isolation of the phosphonium salt or the use of strong base, by reacting together a triarylphosphine, an α-haloester, and a secondary or tertiary amine.

Representative triarylphosphines which can be employed to form the above phosphoranes are triphenyl, tri(p-methylphenyl), tri(p-methoxyphenyl), and tri(p-chlorophenyl).

The α-haloesters which are employed have the formula $R_1CHXCO_2R$ wherein R and $R_1$ have the same significance as above and X is bromine or chlorine. Representative esters are methyl chloroacetate, ethyl chloroacetate, ethyl bromoacetate, ethyl α-bromopropionate, lauryl bromoacetate and methyl α-chlorostearate.

The third reactant is an amine of the type

wherein
$R_5 = R_6 =$ CH$_3$, C$_2$H$_5$, C$_3$H$_7$, C$_4$H$_9$, C$_2$H$_4$OH, C$_5$H$_{11}$, (CH$_2$)$_n$(=2,3,4,5 or 6)
$R_7 =$ H, CH$_3$, C$_2$H$_5$, C$_3$H$_7$, C$_4$H$_9$C$_2$H$_4$OH, C$_5$H$_{11}$.

The reaction can be performed at ambient temperatures or above. It is generally complete in a period of 0.5 to 48 hours. Recovery of the phosphorane is achieved by filtration of the amine salt formed followed by removal of the solvent. The phosphorane can be used as is or purified by recrystallization from an appropriate solvent.

The following examples illustrate the synthesis method of this invention.

EXAMPLE I

A mixture of 8.4 grams of triphenylphosphine, 4.8 grams of ethyl chloroacetate and 10 milliliters of triethylamine was allowed to stand for two days before being filtered. Concentration and extraction with hot ethyl acetate gave 7.7 grams of carbethoxymethylenetriphenylphosphorane.

EXAMPLE II

A mixture of 5.4 grams of ethyl bromoacetate (0.05 mole), 13.1 grams of triphenylphosphine (0.05 mole), 6 milliliters of triethanolamine and 10 milliliters of benzene was allowed to stand after initial warming to dissolve all of the materials. After 24 hours, the precipitated triethanolamine hydrochloride was filtered and the filtrate concentrated to give 13.7 grams of carbethoxymethylenetriphenylphosphorane. Repeating the above reaction in acetone gave 7.6 grams of carbethoxymethylenetriphenylphosphorane.

EXAMPLE III

A solution of 60 grams of methyl chloroacetate (0.5 mole) and 131 grams of triphenylphosphine (0.5 mole) in 100 milliliters of benzene was heated under reflux for 2 hours on a steam bath then transferred to a Waring Blender and diluted with 200 milliliters of benzene. To this mixture was added 60 milliliters of triethylamine and the mixture vigorously agitated for short periods over a 30-minute interval. The precipitate was separated and the filtrate concentrated to give 90 grams of carbomethoxymethylenetriphenylphosphorane. The precipitate was treated with water and an additional 83 grams of phosphorane was obtained; the total yield of phosphorane was 173 grams or 100 percent.

EXAMPLE IV

A solution of 28.3 grams of tri(p-chlorophenyl)phosphine, 18 grams of ethyl α-bromopropionate, and 10 grams of piperidine in 50 milliliters of benzene was stirred at room temperature for 24 hours. Removal of the piperidine hydrobromide by filtration and concentration of the filtrate left 31.7 grams of carbethoxyethylidenetri(p-chlorophenyl)phosphorane.

The phosphoranes produced by the synthetic method of the invention find various uses. They can be reacted with aldehydes or ketones to produce olefinic compounds. Similarly, phosphoranes can be utilized to produce the plant abscission hormone, abscisic acid, as disclosed in U.S. Pat. No. 3,400,158.

Those modifications and equivalents which fall within the spirit of the invention and the scope of the appended claims are to be considered part of the invention.

We claim:
1. A method for synthesizing a compound of the formula

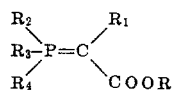

wherein
R represents an alkyl group,
$R_1$ represents hydrogen or an alkyl group,
$R_2$, $R_3$, and $R_4$ each represents phenyl, lower alkylphenyl, lower alkoxyphenyl, or halophenyl which comprises reacting together reactants (a), (b), and (c)
wherein
reactant (a) is a triarylphosphine in which the aryl substituents are selected from phenyl, lower alkylphenyl, lower alkoxyphenyl, or halophenyl;
reactant (b) is an α-haloester of the formula $R_1CHX\text{-}CO_2R$ wherein R is an alkyl group of one to 18 carbon atoms, $R_1$ is hydrogen or an alkyl group of one to 18 carbons,
and X is bromine or chlorine;
reactant (c) is a secondary or tertiary amine of the type

wherein
$R_5 = R_6 = CH_3, C_2H_5, C_3H_7, C_4H_9, C_2H_4OH, C_5H_{11}, (CH_2)_n (=2,3,4,5 \text{ or } 6)$
$R_7 = H, CH_3, C_2H_5, C_3H_7, C_4H_9, C_2H_4OH, C_5H_{11}$.

2. A method in accordance with claim 1 wherein $R_1$ is hydrogen and $R_2$, $R_3$, and $R_4$ are each phenyl.

* * * * *

UNITED STATES PATENT OFFICE
CERTIFICATE OF CORRECTION

Patent No. 3,681,428          Dated August 1, 1972

Inventor(s) Donald Leroy Roberts and William Yates Rice, Jr.

It is certified that error appears in the above-identified patent and that said Letters Patent are hereby corrected as shown below:

Column 1, line 63, "$(CH_2)_n(=2,3,4,5 \text{ or } 6)$" should be
-- $(CH_2)_n(n=2,3,4,5 \text{ or } 6)$ -- line 64, "$C_4H_9C_2H_4OH$," should be -- $C_4H_9$, $C_2H_4OH$, --

Column 4, line 14, "$(CH_2)_n(=2,3,4,5 \text{ or } 6)$" should be
-- $(CH_2)_n(n=2,3,4,5 \text{ or } 6)$ --

Signed and sealed this 2nd day of January 1973.

(SEAL)
Attest:

EDWARD M. FLETCHER, JR.
Attesting Officer

ROBERT GOTTSCHALK
Commissioner of Patents